United States Patent [19]
Boroschewski et al.

[11] 3,904,396
[45] Sept. 9, 1975

[54] HERBICIDAL MIXTURE OF SEVERAL CARBAMOYLOXYPHENYLCARBAMATES

[75] Inventors: Dr. Gerhard Boroschewski, Berlin; Dr. Friedrich Arndt, Aich; Dr. Alfred Czyzewski, Wolfenbuttel, all of Germany

[73] Assignee: Schering Aktiengesellschaft, Berlin, Germany

[22] Filed: Sept. 14, 1973

[21] Appl. No.: 397,499

Related U.S. Application Data

[63] Continuation of Ser. No. 127,395, March 23, 1971, abandoned.

[52] U.S. Cl. .......................... 71/111; 71/88; 71/94; 71/95; 71/98; 71/100; 71/105; 71/106; 71/107
[51] Int. Cl.² ........................................ A01N 9/20
[58] Field of Search ........................................ 71/111

[56] References Cited
UNITED STATES PATENTS
3,692,820  9/1972  Boroschewski et al. .............. 71/111

*Primary Examiner*—Glennon H. Hollrah
*Attorney, Agent, or Firm*—Joseph F. Padlon

[57] ABSTRACT

Two or more carbamoyloxyphenylcarbamates containing the divalent radical

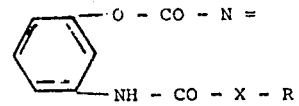

bound to two different carbon atoms or to one carbon atom and one hydrogen atom, X being oxygen or sulfur, and R being lower alkyl, lower alkenyl, or lower alkinyl, synergistically cooperate in a herbicidal composition to make the herbicidal effect of the compositions greater than the combined effects of the individual compounds.

1 Claim, No Drawings

HERBICIDAL MIXTURE OF SEVERAL CARBEMOYLOXYPHENYLCARBAMATES

This is a continuation of application Ser. No. 127,395, filed 3/23/71, now abandoned.

This invention relates to herbicidal compositions containing, as active agents, carbamoyloxyphenylcarbamates.

Carbamoyloxyphenylcarbamates having herbicidal properties have been disclosed in the German published Patent application No. 1,567,151 and in the French Pat. No. 1,498,834. It is also common practice to combine two or more herbicidal components in the same composition to widen the spectrum of undesired plants against which the composition is to be effective. Synergistic cooperation between the multiple herbicidal ingredients of such a composition, however, is very rare, and no rules have been found which would govern synergism and would permit synergistic cooperation of two herbicidal compounds to be predicted.

We have now found that two or more herbicidal carbamoyloxyphenylcarbamates are capable of being combined in amounts sufficient to make the herbicidal effect of the compounds greater than the combined effects of the compounds individually if the compounds include the divalent radical

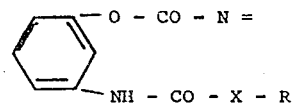

wherein X is oxygen or sulfur, and R is lower alkyl, lower alkenyl, or lower alkinyl, and if the radical is bound by its valences to two different carbon atoms or to one carbon atom and one hydrogen atom.

More specifically, one valence may be bound to aryl, aralkyl, the radical of an aliphatic hydrocarbon or a substitution product thereof, or the radical of a cycloaliphatic hydrocarbon having one or more rings, and subsitution products of the same. The other valence should be bound to hydrogen or the radical of an aliphatic hydrocarbon. Also, the nitrogen atom of the divalent radical may constitute an element of a heterocyclic ring which includes attached carbon atoms, and such a heterocyclic ring may contain other hetero atoms, such as nitrogen or oxygen.

The synergistic herbicidal effects of the compositions of the invention can be observed even with such weeds as *Galium aparine*, *Amarantus retroflexus*, and *Matricaria chamomilla*, which are notoriously resistant to herbicides, and with compositions containing two compounds which differ from each other by as little as one CH₂ group in R.

The moieties attached to the nitrogen atom by the two valances of the radicals may affect the magnitude of the synergistic effect to some extent, but cannot prevent it. Thus, such effects were observed with such diverse moieties attached by one valence as alkyl, cycloalkyl, haloalkyl, norbornyl, phenyl, and phenyl carrying up to three substituents which may be halogen, haloalkyl, alkyl, alkoxy, alkylmercapto, amino and substituted amino, nitro, cyano, carbalkoxy, or carbonamide, the other attached moiety being hydrogen or alkyl.

When a composition of the invention contains amounts of the individual components so small as to have only marginal or partial effects on weeds, the combination of the components may still have full and adequate herbicidal effects, particularly when employed after germination. Application rates of the combined components as low as 0.5 kg/ha (kilogram per hectare) may destroy all weeds in crops of sugar beets, turnips, red beets, rice, and other grains without damaging the crop plants.

The mixing ratio of the compounds may vary widely according to the nature of the compounds, the desired effect, the kind and age of the plants to be destroyed, climatic conditions, and the mode of application. It is impossible therefore to state optimum mixing ratios of the compounds generally, for certain groups of related compounds, or even for individual compounds. A certain amount of experimentation is necessary to adapt the composition to local conditions if nothing else.

Such experimentation should start with a 4:1 to 1:4 ratio, and preferably a 2:1 to 1:2 ratio of the components in a binary mixture, and with approximately equal amounts of the components in a mixture having three or more components. No further modification will be needed in many cases.

It is generally not practical to employ the compounds without a carrier, and the compositions should preferably contain 2 to 80% of the active agents of the invention, all percentage figures in this specification and the appended claims being by weight unless specifically stated otherwise. Under most circumstances, the active ingredients may amount to 15 to 50%, the exact optimum concentration depending on the mode of application and other extraneous circumstances. The remaining 98 to 20% may be made up by materials without herbicidal properties of their own, particularly liquid or solid carriers or diluents. The use of surfactants in amounts of up to 20% may enhance the effectiveness of the composition.

A most favorable balance of effective weed control without or with a minimum of crop damage in sugar beets, turnips, red beets, strawberries, rice, and other cereal crops is achieved at application rates between 0.5 to 4 kg/ha, but best results have been achieved in some cases with higher rates. The compositions are most effective when the herbicidal compounds are dispersed in a liquid carrier to form an emulsion.

However, the compositions are also effective when compounded otherwise, as is conventional in this art. Dusting powders, granulates, solutions, or suspensions may be prepared with solid or liquid carriers, and surfactants may be included in the formulation to improve wetting of the weeds and adhesion of the composition, and such surfactants may be effective in keeping the active agents dispersed in a liquid carrier.

As is common practice, the liquid carrier may be water, a mineral oil fraction, or another organic solvent such as xylene, cyclohexanol, cyclohexanone, isophorone, chloroform, carbon tetrachloride, dimethylformamide, dimethylsulfoxide, and the like. Lime, kaolin, chalk, talcum, attaclay are suitable solid carriers.

Anionic, cationic, and non-ionic surfactants may be employed, and the following surfactants are merely typical of the range of effective compounds: ethoxylated isooctylphenol, ethoxylated octylphenol, ethoxylated nonylphenol, alkylphenol polyglycol ethers, tributylphenyl polyglycol ethers, alkylarylsulfonates, alkylarylpolyetheralcohols, isotridecyl alcohol, alkyl sulfates, laurylether sulfate, condensates of fatty alcohols with ethylene oxide, ethoxylated caster oil, polyhydroxyethylene alkyl ethers, ethoxylated polyhydroxpropylene, sorbitol esters, and lauryl alcohol polyglycol ether acetal.

If it is desired to broaden the application spectrum of the compositions of the invention or to enhance effects against specific weeds, other herbicides may be admixed with some sacrifice in selectiveity. Herbicidal compounds which are compatible with the carbamoyloxyphenylcarbamates of the invention include other carbamic and thiocarbamic acid esters, substituted anilines and anilides, triazines, aminotriazoles, diazines such as uracils, for example, 3-cyclohexyl-5,6-trimethylene-uracil, 1-phenyl-4-amino-5-chloropyridazone-6, aliphatic carboxylic acids, halogenated benzoic and phenylacetic acids, aryloxycarboxylic acids, hydrazides, amides, nitriles, haloaliphatic carboxylic acids, such as 2,2-dichloropropionic acid and its salts, tetrafluoropropionic acid and its salts, esters of such acids, urea derivatives, 2,3,6-trichlorobenzyloxypropanol, and thiocyanates.

The compositions of the invention are prepared by intimately mixing the ingredients, and such mixing may immediately precede application to weeds.

Because of the smaller amounts of herbicides which are required for producing a desired effect, the herbicidal compositions of the invention are less dangerous to plants other than weeds and to other living beings than otherwise closely similar herbicides. The compositions of the invention are effective generally against weeds which are seed bearing plants (Spermatophytae), and particularly against *Stellaria media*, *Lamium amplexicaulis*, *Chenopodium album*, *Amaranthus retroflexus*, *Galium aparine*, *Matricaria chamomilla*, and *Setaria italica*.

Representative compounds which form synergistic mixtures in the compositions of this invention are enumerated in Table 1 together with characteristic physical constants and are provided with capital letter symbols for convenience of reference hereinafter.

TABLE 1

A: Methyl N-[3-(N'-3'-methylphenylcarbamoyloxy)-phenyl]-carbamate, M.P. 139°–142°C.

B: Ethyl N-[3-(N'-3'-methylphenylcarbamoyloxy)-phenyl]-carbamate, M.P. 128°–129°C.

C: Methyl N-[3-(N'-phenylcarbamoyloxy)-phenyl]-carbamate, M.P. 152°C.

D: Ethyl N-[3-(N'-phenylcarbamoylox)-phenyl]-carbamate, M.P. 117°–118°C.

E: Methyl N-[3-(N'-3'-chlorophenylcarbamoyloxy)-phenyl]-carbamate, M.P. 153°–154°C.

F: Ethyl N-[3-(N'-3'-chlorophenylcarbamoyloxy)-phenyl]-carbamate, M.P. 127°–128°C.

G: Methyl N-[3-(N'-4'-methylphenylcarbamoyloxy)-phenyl]-carbamate, M.P. 162°–163.5°C.

H: Methyl N-[3-(N'-3'-methoxyphenylcarbamoyloxy)-phenyl]-carbamate, M.P. 122°–125°C.

I: Methyl N-[3-(N'-3',5'-dimethylphenylcarbamoyloxy)-phenyl]-carbamate, M.P. 157.5°C.

J: Methyl N-[3-(N'-methyl-N'-phenylcarbamoyloxy)-phenyl]-carbamate, M.P. 124°C.

K: S-Methyl N-[3-(N'-tert-butylcarbamoyloxy)-phenyl]-thiocarbamate, M.P. 173°C (decomp.).

L: S-Methyl N-[3-(N'-methylcarbamoyloxy)-phenyl]-thiocarbamate, M.P. 157°C.

M: S-Methyl N-[3-(N'-3'-chlorophenylcarbamoyloxy)-phenyl]-thiocarbamate, M.P. 146°–148°C.

N: S-Methyl N-[3-(N'-3'-methylphenylcarbamoyloxy)-phenyl]thiocarbamate, M.P. 152°–154°C.

O: S-Methyl N-[3-(N'-3'-methoxyphenylcarbamoyloxy)-phenyl]thiocarbamate, M.P. 153°–156°C.

P: S-Methyl N-[3-(N'-phenylcarbamoyloxy-phenyl]-thiocarbamate, M.P. 159°–160°C.

Q: S-Methyl N-[3-(N'-methyl-N'-phenylcarbamoyloxy)-phenyl]-thiocarbamate, M.P. 101°–102°C.

R: S-Methyl N-[3-(N'-ethylcarbamoyloxy)-phenyl]-thiocarbamate, M.P. 153°–155°C.

S: S-Methyl N-[3-(N'-propylcarbamoyloxy)-phenyl]-thiocarbamate, M.P. 149°–150°C.

T: S-Methyl N-[3-(N'-isopropylcarbamoyloxy)-phenyl]-thiocarbamate, M.P. 176°–177°C.

U: S-Methyl N-[3-(N',N'-dimethylcarbamoyloxy)-phenyl]-thiocarbamate, M.P. 119°–121°C.

V: S-Methyl N-[3-(N'-allylcarbamoyloxy)-phenyl]-thiocarbamate, M.P. 164°–166°C.

W: S-Methyl N-[3-(N'-n-butylcarbamoyloxy)-phenyl]-thiocarbamate, M.P. 141°–143°C.

X: S-Methyl N-[3-(N'-isobutylcarbamoyloxy)-phenyl]-thiocarbamate, M.P. 167°–169°C.

Y: S-Methyl N-[3-(N'-neopentylcarbamoyloxy)-phenyl]-thiocarbamate, M.P. 173°–174°C.

Z: Methyl N-[3-(N'-4'-methylpentyl-2'-carbamoyloxy)-phenyl]-carbamate, M.P. 136°–137°C.

AA: Methyl N-[3-(N'-norbornyl-2'-carbamoyloxy)-phenyl]-carbamate, M.P. 190°–191°C.

BB: Methyl N-[3-(N'-2'-methylcyclohexylcarbamoyloxy)-phenyl]-carbamate, M.P. 146.5°–148.5°C.

CC: Methyl N-[3-(N'-3'-methylcyclohexylcarbamoyloxy)-phenyl]-carbamate, M.P. 150°–153°C.

DD: Sec.-butyl N-[3-(N',N'-diethylcarbamoyloxy)-phenyl]-carbamate, M.P. 62°–63°C.

EE: Sec.-butyl N-[3-(N'-isopropylcarbamoyloxy)-phenyl]-carbamate, M.P. 148°–149°C.

FF: Sec.-butyl N-[3-(N'-tert-butylcarbamoyloxy)-phenyl]-carbamate, M.P. 136°–137°C.

GG: Butin-(1)-yl-(3) N-[3-(N'-tert-butylcarbamoyloxy)-phenyl]-carbamate, M.P. 172°–173°C.

HH: S-Methyl N-[3-(N'-2'-methylphenylcarbamoyloxy)-phenyl]-thiocarbamate, M.P. 164°–166°C.

II: S-Methyl N-[3-(N'-4'-methylphenylcarbamoyloxy)-phenyl]-thiocarbamate, M.P. 173°–174°C.

JJ: S-Methyl N-[3-(N'-ethyl-N'-4'-methylphenylcarbamoyloxy)-phenyl]-thiocarbamate, M.P. 104°–105°C.

KK: S-Methyl N-[3-(N'-2',4'-dimethoxy-5'-chlorophenylcarbamoyloxy)phenyl]-thiocarbamate, M.P. 143°–146°C.

LL: S-Methyl N-[3-(N'-3'-fluorophenylcarbamoyloxy)-phenyl]-thiocarbamate, M.P. 150°–151°C.

MM: S-Ethyl N-[3-(N'-4'-ethylphenylcarbamoyloxy)-phenyl]-thiocarbamate, M.P. 153°–154°C.

NN: S-Methyl N-[3-(N'-pentylcarbamoyloxy)-phenyl]-thiocarbamate, M.P. 114°–116°C.

OO: Methyl N-[3-(N'-1'-chlorobutyl-2'-carbamoyloxy)-phenyl]-carbamate, M.P. 143°–144°C.

PP: S-Methyl N-[3-(N'-allylcarbamoyloxy)-phenyl]-thiocarbamate, M.P. 164°–166°C.

Additional carbamate derivatives suitable for the purpose of the invention have been disclosed in the afore-mentioned German published application and French patent.

The following Examples are further illustrative of this invention.

EXAMPLE 1

In a hothouse test, sugar beets (S.B.), *Galium aparine* (G.A.), *Amarantus retroflexus* (A.R.), and *Matricaria chamomilla* (M.C.) were sprayed with the compounds identified in Table 1 by letters A, B, C, D, E, F, G at a rate of 0.5 kg active agent per hectare when the plants had a height of 5 to 10 cm. The active agents were employed singly or in mixtures in aqueous emulsions containing 0.5 kg active agent or agents per 600 liters. The effects were evaluated after 10 days when the treated plants were compared with untreated controls. The results are listed in Table 2, and the observations are expressed on an empirical, but reproducible numerical scale on which 0 stands for total destruction and 10 for absence of visible damage.

TABLE 2

| Agent(s) | Ratio | S.B. | G.A. | A.R. | M.C. |
|---|---|---|---|---|---|
| A | — | 10 | 7.0 | 9.0 | 7.0 |
| B | — | 10 | 4.0 | 6.0 | 7.0 |
| C | — | 10 | 6.0 | 3.0 | 9.5 |
| D | — | 10 | 3.0 | 0 | 10 |
| E | — | 10 | 6.0 | 1.0 | 10 |
| F | — | 10 | 5.0 | 0.5 | 10 |
| G | — | 10 | 10 | 10 | 10 |
| A+B | 1:1 | 10 | 3.0 | 5.0 | 1.5 |
| A+B | 3:1 | 10 | 3.5 | 6.0 | 0.5 |
| A+C | 1:1 | 10 | 4.0 | 1.0 | 5.0 |
| A+D | 1:1 | 10 | 1.0 | 0.5 | 1.0 |

TABLE 2 – Continued

| Agent(s) | Ratio | S.B. | G.A. | A.R. | M.C. |
|---|---|---|---|---|---|
| A+F | 1:1 | 10 | 1.5 | 0 | 2.5 |
| B+C | 1:1 | 10 | 3.0 | 1.0 | 4.0 |
| B+C | 2:1 | 10 | 1.5 | 1.0 | 2.0 |
| B+E | 1:1 | 10 | 3.0 | 1.0 | 5.0 |
| C+F | 1:1 | 10 | 2.0 | 0 | 3.5 |
| A+B+G | 1:1:1 | 10 | 3.0 | — | 1.0 |

EXAMPLE 2

Analogous tests were performed with compounds A, H, I, J on Sugar beets (S.B.), rice (RI.), wheat (WH.), rye (RY.), *Setaria italica* (S.I.), and *Centaurus cyanus* (C.c.). The results are listed in Table 3.

TABLE 3

| Agent(s) | Ratio | S.B. | RI. | WH. | RY. | S.I. | C.c. |
|---|---|---|---|---|---|---|---|
| A | — | 10 | 10 | 10 | 10 | 4 | 8 |
| H | — | 10 | 10 | 10 | 10 | 7 | 10 |
| I | — | 10 | 10 | 10 | 10 | 3 | 8 |
| J | — | — | 10 | 10 | 10 | 4 | 3 |
| A+H | 1:1 | 10 | 10 | 10 | 10 | 1 | 5 |
| A+I | 1:1 | 10 | 10 | 10 | 10 | 0 | 3 |
| A+J | 1:1 | — | 10 | 10 | 10 | 0 | 0 |

The results achieved with binary and ternary mixtures of other compounds listed in Table 1 were so closely similar to those indicated above as to make tabulation unnecessary. At least qualitatively similar results were obtained with compounds described above but not specifically enumerated in Table 1.

It should be understood, therefore, that the foregoing disclosure refers solely to preferred embodiments of the invention, and that it is intended to cover all changes and modifications of the examples of the invention herein chosen for the purpose of the disclosure which do not constitute departures from the spirit and scope of the invention set forth in the appended claims.

We claim:

1. A composition consisting essentially of a herbicidal amount of an admixture of methyl N-(N'-3'-methylphenylcarbamoyloxyl)phenyl) carbamate and ethyl N-3(N'-3'-phenylcarbamoyloxy)phenyl) carbamate in a weight to weight ratio of 1:1, the balance of the composition being an inert diluent or carrier.

* * * * *